United States Patent [19]
Burke, Jr. et al.

[11] 3,861,791

[45] Jan. 21, 1975

[54] FILM HANDLING CASSETTE EMPLOYING FILM CLEANING AND DEVELOPING ARRANGEMENTS

[75] Inventors: Edward F. Burke, Jr., Reading, Mass.; Frank M. Czumak, Derry, N.H.

[73] Assignee: Polaroid Corporation, Cambridge, Mass.

[22] Filed: Dec. 26, 1973

[21] Appl. No.: 428,381

[52] U.S. Cl. ................. 352/130, 96/29 R, 96/76 R, 117/111 R, 134/122
[51] Int. Cl. ........................................... G03c 11/00
[58] Field of Search .......... 352/130; 96/76 R, 29 R, 96/76 C; 134/64, 122; 117/111 R, 111 D, 112

[56] References Cited
UNITED STATES PATENTS
3,641,896 2/1972 Downey .......................... 352/130 X
3,748,994 7/1973 Stella ............................. 352/130 X Primary Examiner—Monroe H. Hayes
Attorney, Agent, or Firm—David R. Thornton

[57] ABSTRACT

Apparatus for processing of a photographic film to a viewable condition including an applicator for forming a thin, substantially uniform layer of processing fluid on a moving run of the film and for cleaning the film to remove particles therefrom prior to fluid deposition so as to preclude interference by the particles with the formation of the fluid layer.

22 Claims, 3 Drawing Figures

3,861,791

FILM HANDLING CASSETTE EMPLOYING FILM CLEANING AND DEVELOPING ARRANGEMENTS

BACKGROUND OF THE INVENTION

This invention relates to processing apparatus and, more particularly, an improved multipurpose film handling cassette for processing of photographic film. Multipurpose photographic film cassettes have been developed for use in motion picture photographic systems capable of processing an exposed strip of photographic material to a viewable condition as illustrated and described in such prior references as U.S. Pat. No. 3,615,127 issued to Edwin H. Land on Oct. 26, 1971; U.S. Pat. No. 3,623,417 issued Nov. 30, 1971 to Vaito K. Eloranta; and U.S. Pat. No. 3,748,994 issued July 31, 1973 to Joseph A. Stella, all of which are owned by the assignee of the present invention.

In such systems, use is made of a film handling cassette within which the several operations of exposure, chemical processing, drying and projection of the recorded images may be accomplished without transferring the film from the cassette. In this arrangement, the strip of photographic film contained in the cassette can be exposed in a camera adapted to receive the cassette and then processed to provide viewable images by placing the cassette in a viewing apparatus equipped to activate the cassette contained processor upon rewinding the exposed film strip. After processing in this manner, the viewing apparatus is operated as a projector to advance the film incrementally frame by frame past a light source for viewing of the recorded images.

In this arrangement, the unexposed photosensitive strip, initially wound upon a supply reel, preferably passes from the supply reel through a normally inoperable processing station and then across an opening of the cassette which functions at different intervals at both an exposure and projection station. Beyond the exposure station, the film is wound onto a take-up reel. Preferably when substantially the entire length of the photosensitive strip in the cassette has been exposed and wound onto the take-up reel, the cassette is then loaded into a special purpose projector in which the motion of the film is reversed, this time passing from the take-up reel onto the supply reel. In its movement in this reverse direction, the film strip is subjected to a processing treatment in which a thin layer of processing fluid is applied to exposed portions of the film emulsion by means such as, for example, a doctor blade in communication with and supplied with processing fluid from a fluid reservoir.

The achievement of a substantially uniform and complete layer of processing fluid over a useable length of the film strip is vital to satisfactory operation of the system inasmuch as any abrupt irregularity or nonuniformity causing reduced thickness of the fluid layer or less than complete contact of the emulsion layer by the processing fluid will result in variations in the recorded scenes which are observable during projection of the processed film. One difficulty in producing a satisfactory, uniform layer is caused by particles of dust or other contaminants which may find their way into the cassette and onto the film strip prior to film development. Such particles while generally reducing contact of the processing fluid with the emulsion are particularly objectionable when they are of size sufficient to be captured by the processor doctor blade thereby causing a wake in the layer of applied fluid on the moving run of the film and resulting in objectionable streaks in the developed film. It can be appreciated that this problem of achieving a uniform layer or coating of the fluid on the film is complicated by the cassette openings, which while necessary to the operation of the system, permit the ingress of particles, by the requirement that each cassette carry its own processor, and further by the fact that the cassette and its components must be capable of mass production techniques and be compatible with the dust contaminant levels incident to such techniques in order for the system to be commercially acceptable. Hence, it can be appreciated that the minimization of the effect of particles on the processing fluid operation is extremely critical to the overall system in which the cassette is employed.

SUMMARY OF THE INVENTION

In accordance with the present invention, the control of particles during the processing fluid operation in a multipurpose cassette of the type referred to, is provided by subjecting the emulsion surface of the film strip to a cleaning bath just prior to or in advance of deposition of the fluid layer on the emulsion surface. Preferably, the processing fluid is also utilized for cleaning of the film and both the cleaning and the fluid layer applications are accomplished within an integral processing station of the cassette. In this arrangement, the fluid applicator includes a pair of openings or fluid nozzles serially arranged along the direction of film travel. The first or leading opening, as viewed with respect to the film travel, first exposes the film to the processing fluid so to clean the confronting emulsion surface while the second or trailing opening is employed to deposit the desired fluid layer.

In regard to the latter, a doctor blade element disposed at the trailing edge of the trailing opening is spaced a predetermined distance from the emulsion layer of the film so as to produce a processing fluid layer of predetermined thickness. A similar blade-like element carried at the trailing edge of the first opening is more closely spaced to the film that the aforementioned doctor blade so as to operate as a scraper blade which captures particles of a size equal to or greater than the doctor blade spacing and thereby precludes the latter from capture by the layer defining doctor blade.

Accordingly, it is a primary object of this invention to provide an improved photographic system for processing a strip of exposed photographic material.

Another primary object of this invention is to provide a compact photographic cassette configured for applying a substantially uniform layer of processing fluid to a contained strip of photographic material.

A further object of this invention is to provide improved photographic apparatus for cleaning a strip of exposed photographic material and subsequently applying a processing fluid thereto.

A still further object of this invention is to provide a method of cleaning a strip of photographic film material and for applying a uniform fluid layer thereto.

BRIEF DESCRIPTION OF THE DRAWINGS

The novel features that are considered characteristic of the invention are set forth with particularity in the appended claims. The invention itself, however, both as to its organization and its method of operation together with additional objects and advantages thereof, will be best understood from the following description of the preferred embodiment when read in connection with the accompanying drawings wherein like numbers have been employed in the different figures to denote the same parts and wherein:

DETAILED DESCRIPTION OF THE PREFERRED EMBODIMENT

Figure 1:
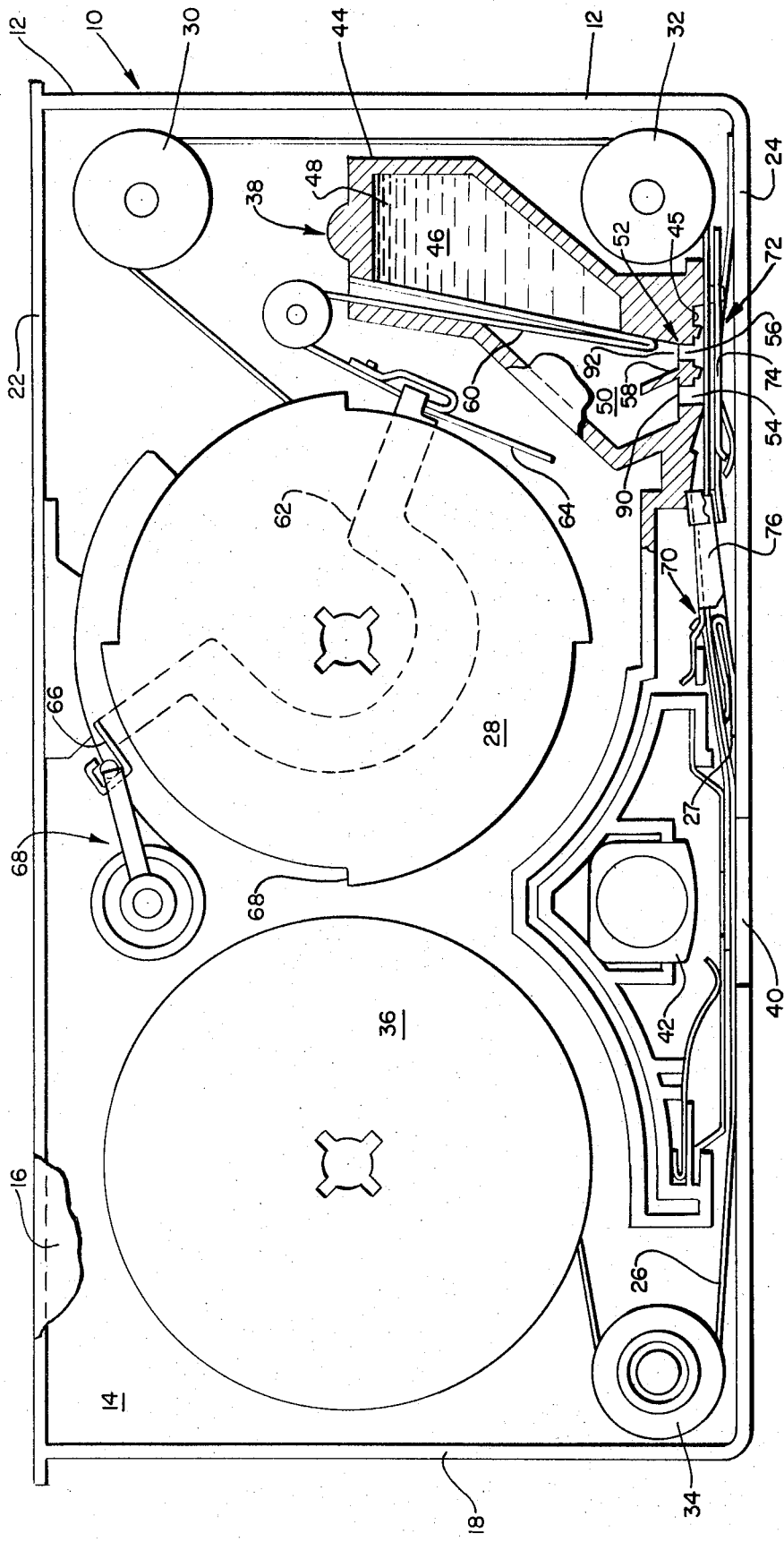
FIG. 1 is a diagrammatic plan view, partially cut away, of a film handling cassette embodying the present invention.

In FIG. 1 of the drawings, a multipurpose film cassette in which the improved processing apparatus of the present invention is particularly suited for use in generally designated by the reference numeral 10 and includes an essentially parallelepiped casing or housing 12 constituted by large planar faces or side walls 14 and 16, end walls 18 and 20, and elongated top and bottom edge walls 22 and 24. Carried within the housing 12 is a photographic film strip 26 which is permanently attached at one of its ends (not shown) to a rotatable supply spool or reel 28 from which it extends within the casing 12 in a somewhat extended path around suitable rollers 30, 32 and 34 to a take-up spool or reel 36 to which the opposite end (not shown) of the film strip is attached. In its path within the casing 12, the film strip 26 extends across a normally inoperative film processor 38, which is subsequently explained in detail wih regards to FIG. 2, and across an opening 40 which functions at different times to facilitate both exposure and projection operations. For enabling the latter operation, a reflecting prism 42 is mounted behind the film strip 26 in an adjoining relation to both the opening 40 and to an illumination aperture (not shown) of the side wall 14.

The film processor 38 includes a housing 44 having a first compartment or receptacle 46 retaining a source of processing fluid or composition 48 mounted to one side of a second internal chamber 50 which communicates with a nozzle area generally designated by the reference numeral 52 and having a pair of nozzles or openings 54 and 56. As later explained in detail with regard to FIG. 3, the openings 54 and 56 permit fluid to flow to the film strip 26 so as to both clean the film strip and deposit the fluid 48 thereon. To this end as later explained in detail with regard to FIG. 3, a partition 58 extends parallel to openings 54 and 56 and subdivides the bottom of the compartment 50 into two separate areas designated 90 and 92.

Prior to completing the description and operation of the nozzle area 52, the remainder of the processor 38 and its cooperation with other portions of the cassette 10 for the release of the processing fluid 48 will be explained. The fluid 48 is initially retained within the sealed tub-like receptacle 46 by a tear tab 60 which extends from the processor housing 44 to a tab actuating assembly generally designated by the numeral 62. The actuating assembly 62 which is biased towards the processor 38 by a spring member 64 extends beneath the film spool 28 to an end portion 66 which is configured for engagement with teeth 68 formed on this spool. The end portion 66 is retained in an initial position by a release cam mechanism 68. As explained in the aforementioned U.S. Pat. No. 3,748,994, upon insertion of the cassette 10 into a projector (not shown) and operation of the cam release mechanism 68, the tab actuating assembly 62 is released to bring its end portion 66 into engagement with the teeth 68 of the spool 28. Then upon rotation of the film spool 28 in the rewind direction, (clockwise as shown by the arrow in FIG. 1), one of the spool teeth 68 operatively engages the end portion 66 to rotate the actuating assembly 62 along with the spool 28 so as to draw the tab 64 from the fluid receptacle 46 and thereby release the retained fluid 48 to the chamber 50 and through its nozzle openings 54 and 56 to the underlying portions of the film strip 26.

The processor 38 incorporates a nozzle valve 70 which as later explained in detail with respect to the operation of the cassette is utilized to close off the processor nozzles following treatment of the film strip 26 with the processing fluid 48. In relation to the nozzle opening 56, the valve 70 is positioned initially to the left as shown in FIG. 1 or in front of the nozzle openings in terms of film strip travel during rewind. Additionally, a pressure pad component designated at 72 is positioned beneath the nozzle openings 54 and 56 and slightly to the right thereof as shown in FIG. 1, or that is, slightly rearwardly of these openings in terms of film strip travel during rewind. In these initial positions, neither the valve 70 or the pressure pad 72 restricts free travel of the film strip during the exposure operation in which film travel is in a direction opposite to that during rewind. The viewing apparatus (not shown) in which the film strip is processed is programmed such that just prior to release of the tear tab 60 in a manner described above, the film strip 26 is advanced through a final travel from the supply spool 28 to the take-up spool 36. During this final travel, a discontinuity on the film strip 26, for example, a protuberance (not shown) located at the supply spool or trailing end of the film strip, engages the pressure pad 68 to displace it slightly to the left from the position illustrated in FIG. 1, so that a precision formed film engaging surface 74 carried thereon is brought under and into juxtaposition with the nozzle openings 54 and 56 to thereby retain an interposed, incremental portion of the film strip 26 firmly against the undersurface of the applicator housing 44 as is later described in more detail with regard to FIG. 2.

Following the processing operation and also as a result of another film discontinuity (not shown) located at the other (the leading or take-up end) of the film strip, the valve 70 is moved to the right from the position illustrated in FIG. 1 so that it underlies and blocks the nozzle openings 54 and 56. During this displacement of the valve 70, the pressure pad 72 is cammed downwardly away from the film strip 26 by side cams 74 of the valve so as to deactivate the pressure pad and to free the film strip 26 for unrestricted travel in either direction for subsequent projection and rewind cycles.

Figure 2:
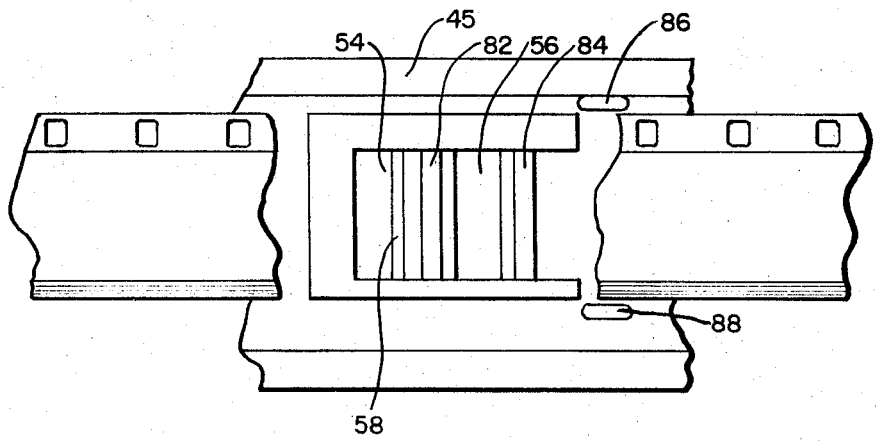
FIG. 2 is an enlarged bottom plan view of the fluid applicator employed in the cassette of FIG. 1.

To complete the description of the processor 38 and particularly its novel pair of nozzle openings 54 and 56, the film confronting surface 45 which forms the base or lower surface of the applicator housing 44 will now be described with regards to FIG. 2. As shown in this figure, the bottom surface 45 which confronts the film strip 26 includes a raised, U-shaped 78 which guides the film under the openings 54 and 56 responsive to the support pressure of the pod 72. Depending from the nozzle surface 45 are a pair of stop members 86 and 88 which cooperate with the slide valve 70 to stop the latter in its fluid blocking position subsequent to completion of the processing operation. Extending transversely between the leg portions 77 and 79 of the U-shaped surface 78 are a pair of doctor blade elements 82 and 84 which cooperate with the dispensed fluid during the processing operation as explained below with regards to FIG. 3.

As can be seen more clearly in FIG. 3, the leading blade element 82 is located below the partition 58. This partition 58 confines the cleaning portion of the fluid 48 (the portion contacting the film strip through the leading opening) to the compartment section 90. In the novel processor illustrated in this embodiment, the first or leading blade member 82 is spaced more closely to the moving film than the second blade and cooperates with the fluid flowing through the first opening 54 as viewed with respect to film travel in the rewind or processing direction, to capture particles which could interfere with the formation of a uniform coating on the film as the latter advances beneath the second or trailing doctor blade 84. In this regard, the trailing opening 56 operates in conjunction with the doctor blade 84 to define the final fluid layer on the film strip 26.

Figure 3:
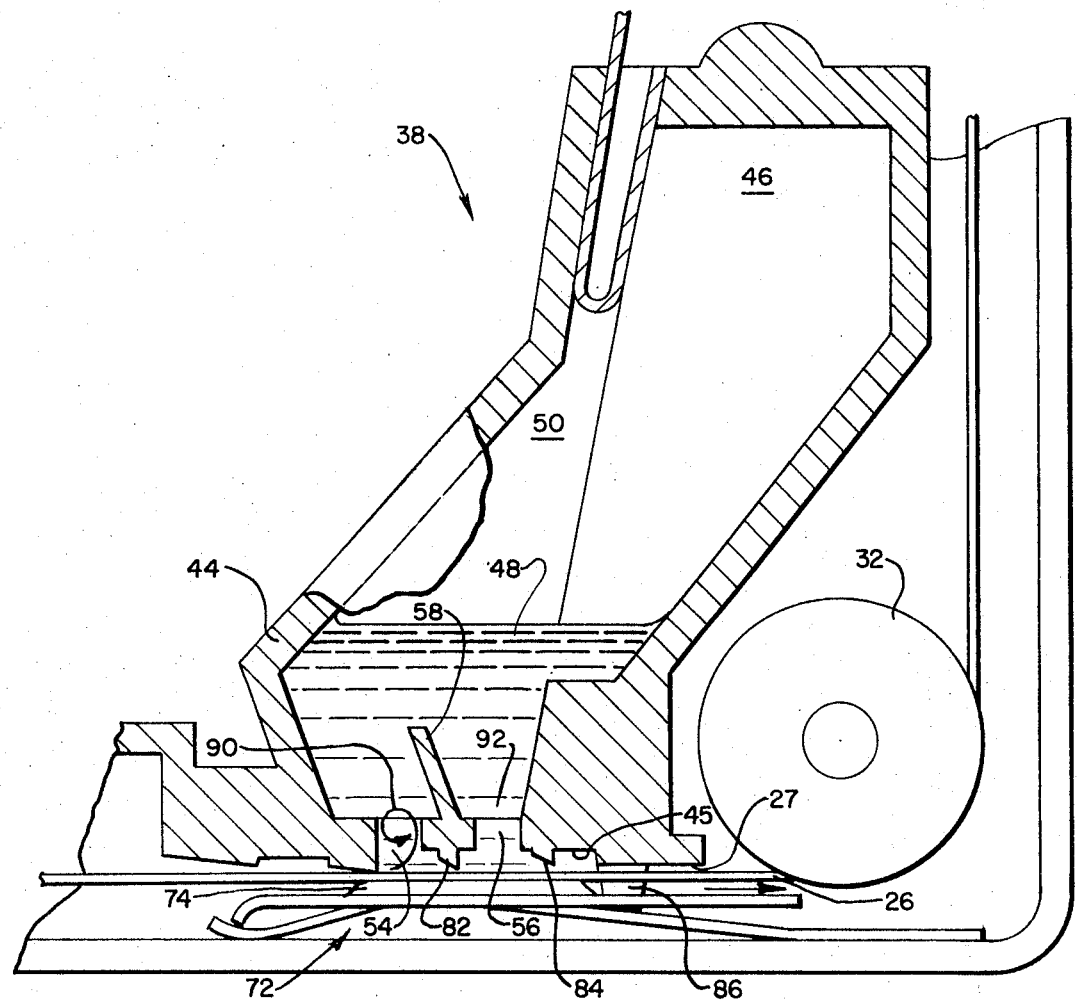
FIG. 3 is an enlarged view in section of the fluid applicator shown in FIG. 1.

In the process operation, during rewind which provides film travel to the right as shown by the arrow in FIG. 3, fluid emitted by the leading opening 54 contacts the emulsion surface film and wets the latter. Contact of the fluid with the moving run of film creates a vortex in the fluid, for example, currents as shown by the arrow in opening 54 which tend to lift particles from the film and to circulate and retain them in the opening 54 and the subdivided portion 90 of the applicator compartment 50. These particles, picked up by the fluid, generally tend to remain in suspension and to be circulated in this generally segregated volume of the fluid 48. Hence, the partition 58 serves to isolate the cleaning portion or particle carrying portion from the remainder of the fluid 48 in chamber 50. Additionally, as previously noted, the doctor blade 82 depends from the surface 45 a distance exceeding the extension of the trailing blade 84 such that the leading blade 82 is more closely spaced to the moving film and will engage and capture any nonsuspended particles which are greater than the actual spacing of this blade from the film strip. Hence, any particles, not carried off by the fluid emitted from the leading opening 54, which pass the blade 82 will also be able to easily pass the blade 84 and will not interfere with the formation of the fluid layer determined by the final blade 84. In a sense, in addition to the removal of particles by the fluid acting as wash due to film movement, the leading blade acts as a particle gate or scraper which captures the most objectionable particles. It should be noted, that while large particles, for example, equal or greater than the film to the leading blade spacing which are captured by the first blade 82 and provide a wake in the fluid deposited by the leading opening and blade, this wake is of little or no consequence since the subsequent deposit of processing fluid by opening 56 in cooperation with the doctoring by the trailing blade 84 will completely obliterate such wakes and provide a substantially streakless layer of fluid on the film strip 26.

In a preferred embodiment, the trailing doctor blade 84 which defines the ultimate thickness of the fluid layer on the film was spaced from the film approximately .00065 inches so as to produce a fluid layer of approximately one-half this thickness while the leading blade was spaced from the film approximately 0.00015 inches (one-quarter to one-fifth the distance of the trailing blade) so as to capture particles substantially equal or greater in size than this latter spacing. Any other particles will either be suspended in the fluid portion or will pass the doctor blade 84 with a minimum adverse affect on the fluid layer and the finally developed film strip 26. In this example, each of the openings were approximately 0.110 inch wide and 0.080 inch long (as measured in the direction of film travel). Additionally, the partition 58 extended approximately 0.250 inch above the processor opening so as to prevent mixing of particle bearing portions of the fluid with other cleaner portions of the same.

In the illustrated embodiment, the cleaning structure including its closely spaced blade 82 is integrally combined with the processor 38; however, it should be noted that a cleaning arrangement having a separate fluid chamber, orifice and particle gate may be separately provided upstream from the processor. Further, the use of a discrete cleaning arrangement may also permit the use of fluids other than the processing fluid but otherwise compatible to the latter. However, it should be noted that the use of processing fluid for film washing is preferred since the residue of the cleaning fluid can become part of the operating layer of processing fluid and, hence, not be specially eliminated or absorbed, etc.

In the illustrated embodiment only a single cleaning station, that is, orifice 54 and scraper blade 82 are employed, however, two or more of these stations serially arranged forwardly of the coating station may be utilized, for example, three or more serially aligned openings with each with a trailing edge blade would provide enhanced two station cleaning of the film strip. Advantageously each of the cleaning stations would be separated or the head of fluid over each partially compartmentalized by interposed partitions so as to segregate their cleaning portion of the fluid.

Thus it will be seen that by this invention there is provided an improved processing fluid applicator and multipurpose photographic film cassette of the type described as well as an improved processing method by which the aforementioned objectives are completely fulfilled. The applicator system and method provide a cleaning device in which the film is advanced across a fluid bath which wets the film emulsion and removes particles carried thereon in advance of deposition of a uniform coating of processing fluid on the film emulsion. The cleaning fluid is driven into a vortex so as to remove and suspend particles, and a blade element is closely spaced to the film emulsion so as to completely trap harmful particles from passing to the final coating area. A novel structure has been described in which the cleaning and coating arrangements are located within an integral or processor in communication with a fluid receiving chamber and includes a partition wich segregates particle retaining portions of the fluid from other portions deposited to define the fluid layer.

It should be understood that this invention may be practiced or embodied in still other ways without departing from the spirit or essential character thereof. The preferred embodiments described therein are therefore illustrative and not restrictive, the scope of the invention being indicated by the appended claims and all variations which come within the meaning of the claims are intended to be embraced therein.

What is claimed is:

1. An applicator for treating with processing fluid an exposed strip of photographic film material having a light sensitive emulsion on one surface so as to develop viewable images on such film strip, said applicator comprising a housing including a chamber configured to receive such processing fluid, said housing including a processor nozzle having a surface formation configured to confront the emulsion layer on the film strip and having a pair of openings through said surface formation for expressing processing fluid to at least a portion of such emulsion intermediate the margins of such film strip when relative motion is effected between such film strip and said housing so as to advance such film strip serially across said openings, a first of said openings in relation to the relative motion of such film strip during processing being operative to wet such emulsion layer with such fluid so as to remove particles therefrom, and a second of said openings being configured for depositing a layer of such processing fluid on at least such intermediate portion.

2. The applicator of claim 1 wherein said surface formation includes a pair of blades extending across such film strip, said first of said blades being located rearwardly of said first opening and between said first and said second opening and a second of said blades being located rearwardly of said second opening such that said first blade cooperates with the fluid dispensed by said first opening for retaining particles located on such film strip and said second blade cooperates with the fluid dispensed by said second opening to form said layer of processing fluid.

3. The applicator of claim 1 wherein said surface formation includes a pair of blades extending across such film strip, a first of said blades being located rearwardly of said first opening and between said first and said second opening, and a second of said blades being located rearwardly of said second opening such that said first blade cooperates with the fluid dispensed by said first opening for retaining particles located on such film strip and said second blade cooperates with the fluid dispensed by said second opening to form said layer of processing fluid, said second blade being spaced a predetermined distance from said film strip so as to define a layer of processing fluid of a predetermined thickness on such film strip, said first blade being more closely spaced from said film strip than said predetermined distance of said second blade so as to substantially preclude passage of particles on such film strip of size close to or greater than said predetermined spacing of said second blade and therey prevent capture of particles by said second blade.

4. The applicator of claim 3 wherein said chamber includes means for confining a portion of such processing fluid in operative relation to each of said openings when said fluid is received in said chamber so as to segregate the one portion of such fluid in communication with such film strip through said first opening from other portions of such fluid to thereby substantially preclude particles, removed from such film by said first fluid portion, from passing into said other portion of such fluid and through said second opening to such film.

5. The applicator of claim 3 wherein said first blade is spaced a distance from such film which is approximately one-quarter of said predetermined distance.

6. The applicator of claim 1 wherein said chamber includes means for confining a portion of such processing fluid in operative relation to each of said openings when said fluid is received in said chamber so as to segregate the one portion of such fluid in communication with such film strip through said first opening from other portions of such fluid to thereby substantially preclude particles, removed from such film by said first fluid portion, from passing into said other portion of such fluid and through said second opening to such film.

7. In a multipurpose film cassette containing a strip of photographic film having a light sensitive emulsion on one surface and adapted to be exposed and processed without removal from the cassette, the cassette also containing a processor for applying a coating of processing fluid on the emulsion after exposure, the improvement comprising:

a processor nozzle having a surface formation positioned in the cassette to confront the emulsion layer on the film strip and having a pair of openings through said surface formation for expressing processing fluid to at least a portion of such emulsion layer intermediate the margins of such film strip, a first of said openings in relation to film strip travel during processing being operative to wet such emulsion layer with such fluid so as to remove particles from said film strip, and a second of said openings being configured for depositing a layer of such processing fluid on said intermediate portion.

8. The cassette of claim 7 wherein said surface formation includes a pair of blades extending across such film strip, a first of said blades being located rearwardly of said first opening and between said first and said second opening, and a second of said blades being located rearwardly of said second opening such that said first blade cooperates with the fluid dispensed by said first opening for retaining particles located on such film strip and said second blade cooperates with the fluid dispensed by said second opening to form said layer of processing fluid.

9. The cassette of claim 7 wherein said processor includes a housing including a chamber configured to receive such processing fluid, said housing including said confronting surface, said openings providing communication between said chamber and said confronting surface, said housing including means for confining a portion of such processing fluid in operative relation to each of said openings when said fluid is received in said chamber so as to segregate the one portion of such fluid in communication with such film strip through said first opening from other portions of such fluid to thereby substantially preclude particles, removed from such film by said first fluid portion, from passing into said other portion of such fluid and through said second opening to such film.

10. The cassette of claim 7 wherein said surface formation includes a pair of blades extending across such film strip, a first of said blades being located rearwardly of said first opening and between said first and said second opening, and a second of said blades being located rearwardly of said second opening such that said first blade cooperates with the fluid dispensed by said first opening for retaining particles located on such film strip and said second blade cooperates with the fluid dispensed by said second opening to form said layer of processing fluid, said first blade element being more closely spaced to said film strip than said second blade element so that said first blade substantially precludes particles of a size substantially equal to or greater than the distance between said second blade and such film strip from passing to said second blade so as to thereby prevent capture of particles by said second blade.

11. In a multipurpose cassette containing a strip of photographic film having an applicator configured for applying a layer of processing fluid on at least a portion of such film strip intermediate the longitudinal margins thereby during advancement of such film in a given direction within said cassette, the improvement comprising cleaning means for engaging at least such intermediate portion of such film strip with a fluid forwardly of said processing fluid applicator in relation to said predetermined direction of advancement so as to remove particles from progressive incremental sections of such film strip prior to deposit of such processing fluid on such incremental sections.

12. The cassette of claim 11 wherein said applicator includes means for depositing processing fluid on such film strip including a doctor blade member spaced a predetermined distance from such film strip and extending thereacross so as to define a layer of predetermined thickness of such deposited fluid on said film strip, and said cleaning means includes a scraper blade member extending across such intermediate portion of such film strip and more closely spaced from such film strip than said predetermined distance so as to substantially preclude passage of particles on such film strip of a size close to or exceeding such predetermined distance.

13. The cassette of claim 12 wherein said scraper blade is spaced from such film strip a distance which is approximately one-quarter of said predetermined distance.

14. The method of depositing a uniform layer of processing fluid on at least a surface portion intermediate the margins of a strip of photographic film material during advancement of the strip in a predetermined direction, said method comprising the steps of:
   depositing processing fluid on progressive incremental sections of said intermediate portion of said film strip as said incremental sections are advanced in said predetermined direction;
   blading the fluid uniformly across said intermediate portion of each of such sections behind said fluid deposit in relation to said predetermined direction of film travel including maintaining a doctor blade element a predetermined distance over said film strip;
   contacting progressive incremental sections of at least said intermediate portion forwardly of said processing fluid deposit with a fluid to capture film carried particles; and
   blading said particle capturing fluid behind said deposit of said particle capturing fluid and before said deposit of said processing fluid to prevent passage of particles of a size close to said predetermined spacing from being carried by said film strip to said doctor blade element.

15. The method of claim 14 wherein said last-mentioned blading step includes maintaining a second blade element forwardly of said first blade element in relation to said advancement of said film and at a second predetermined spacing from said film, which second predetermined spacing is substantially less than said first-mentioned predetermined spacing.

16. The method of claim 15 wherein said second blade is maintained at less than one-quarter of said first-mentioned predetermined distance.

17. The method of depositing a uniform layer of processing fluid on at least a surface portion intermediate the longitudinal margins of a cassette contained photographic film strip during advancement of said film strip in a predetermined direction, said method comprising:
   depositing a layer of processing fluid on progressive incremental sections of said intermediate portion of said film strip as said incremental sections are advanced in said predetermined direction;
   passing fluid through an opening in a surface formation confronting said intermediate portion forwardly of said deposit of said layer of processing fluid so as to cause a fluid vortex in said fluid passing through said opening to thereby capture and remove particles carried on said intermediate portion of said film strip.

18. The method of depositing a uniform layer of processing fluid on at least a surface portion intermediate the longitudinal margins of a photographic film strip, said method comprising:
   advancing said film strip in a predetermined direction;
   depositing a layer of processing fluid on progressive incremental sections of said intermediate portion of said film strip as said incremental sections are advanced in said predetermined direction; and
   passing said processing fluid through an opening in a surface formation confronting said intermediate portion forwardly of said deposit of said layer of processing fluid so as to capture and remove particles carried on said intermediate portion of said film strip prior to deposit of said layer.

19. The method of depositing a uniform layer of processing fluid on at least a surface portion intermediate the longitudinal margins of a photographic film strip during advancement of said film strip in a predetermined direction, said method comprising:
   depositing a layer of processing fluid on progressive incremental sections of said intermediate portion of said film strip as said incremental sections are advanced in said predetermined direction;
   passing processing fluid through an opening in a surface formation confronting said intermediate portion forwardly of said deposit of said layer of processing fluid so as to cause a fluid vortex in said fluid passing through said opening to thereby capture and remove particles carried on said intermediate portion of said film strip.

20. An applicator for treating with processing fluid an exposed film strip, said applicator including means for depositing a layer of processing fluid on at least a portion of such film strip intermediate the longitudinal margins thereof when relative motion is effected between such film strip and said applicator, the improvement comprising cleaning means for engaging at least such intermediate portion of such film strip with such processing fluid forwardly of said layer depositing means in relation to the relative motion of such film strip so as to remove particles from progressive incremental sections of such film strip prior to deposit of such processing fluid layer by said layer depositing means.

21. The applicator of claim 20 wherein said applicator includes means for depositing processing fluid on such film strip including a doctor blade member spaced a predetermined distance from such film strip and extending thereacross so as to define a layer of predetermined thickness of such deposited fluid on said film strip, and said cleaning means includes a scraper blade member extending across such intermediate portion of such film strip and more closely spaced from such film strip than said predetermined distance so as to substantially preclude passage of particles on such film strip of a size close to or exceeding such predetermined distance.

22. An applicator for treating with processing fluid a strip of photographic film having a light sensitive emulsion on one surface, said applicator including means for applying a layer of processing fluid on such emulsion surface when relative motion is effected between such film strip and said applicator, the improvement comprising:

cleaning means having a surface formation for confronting such emulsion layer on the film strip, said surface including an opening through said surface formation for expressing fluid to at least a portion of such emulsion layer intermediate the margins of such film strip, said opening being located forwardly of said layer applying means in relation to film strip travel during processing, said opening being operative to wet such emulsion layer with such fluid and configured to cooperate with such relative motion to form a vortex in such fluid so as to remove particles from such film strip.

* * * * *